(12) United States Patent
Imoto

(10) Patent No.: US 9,450,485 B2
(45) Date of Patent: Sep. 20, 2016

(54) POWER SUPPLY CONTROL APPARATUS

(75) Inventor: Masayoshi Imoto, Yokkaichi-shi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 416 days.

(21) Appl. No.: 14/237,215

(22) PCT Filed: Sep. 6, 2012

(86) PCT No.: PCT/JP2012/072669
§ 371 (c)(1),
(2), (4) Date: Feb. 5, 2014

(87) PCT Pub. No.: WO2013/035763
PCT Pub. Date: Mar. 14, 2013

(65) Prior Publication Data
US 2014/0191571 A1    Jul. 10, 2014

(30) Foreign Application Priority Data

Sep. 8, 2011    (JP) .................................. 2011-196250

(51) Int. Cl.
*B60L 1/00* (2006.01)
*H02M 3/02* (2006.01)
*B60R 16/03* (2006.01)

(52) U.S. Cl.
CPC ................ *H02M 3/02* (2013.01); *B60R 16/03* (2013.01)

(58) Field of Classification Search
CPC ................................ H02M 3/02; B60R 16/03
USPC ......................................................... 307/10.1
See application file for complete search history.

(56) References Cited

U.S. PATENT DOCUMENTS

| 2009/0160249 A1* | 6/2009 | Soma ................... B60L 11/005 307/9.1 |
| 2013/0116914 A1* | 5/2013 | Morimura ............... B60L 11/14 701/112 |

FOREIGN PATENT DOCUMENTS

| JP | 10-266920 A | 10/1998 |
| JP | 2000-312444 A | 11/2000 |
| JP | 2004-92564 A | 3/2004 |
| JP | 2010-74913 A | 4/2010 |

OTHER PUBLICATIONS

International Search Report issued in International Patent Application No. PCT/JP2012/072669 dated Feb. 12, 2013.

\* cited by examiner

*Primary Examiner* — Jared Fureman
*Assistant Examiner* — Duc M Pham
(74) *Attorney, Agent, or Firm* — Oliff PLC

(57) ABSTRACT

A power supply control apparatus has a voltage detection unit that detects output voltage of a battery or alternator; a condition acquisition unit that acquires an engine condition; a voltage transformation unit that raises or lowers output voltage; a switching unit that switches power supply to in-vehicle devices to either of the output voltage and a voltage transformed by the voltage transformation unit; and a control unit that outputs instruction to the switching unit based on the output voltage value and the engine condition. The switching unit switches the power supply destination between a first in-vehicle device group to which a voltage higher than V1 is to be supplied and a second different in-vehicle device group and the control unit outputs instruction to lower or raise the voltage to the voltage transformation unit, and outputs instruction to switch between the first and second in-vehicle device groups to the switching unit.

3 Claims, 4 Drawing Sheets

POWER SUPPLY CONTROL APPARATUS

CROSS-REFERENCE TO RELATED APPLICATIONS

This application is the national phase under 35 U.S.C. §371 of PCT International Application No. PCT/JP2012/072669 which has an International filing date of Sep. 6, 2012 and designated the United States of America.

FIELD

The present invention relates to a power supply control apparatus that controls power supplied to various kinds of electric devices provided to a vehicle.

BACKGROUND

Conventionally, various kinds of electric devices provided to the vehicle are supplied with power with a battery and an alternator as the power source. When the vehicle starts from idle stop, the power to the electric devices is supplied by the battery. When this is done, if the output voltage of the battery becomes lower than the driving voltages of the electric devices because of cranking, a trouble occurs such that the memory of the navigation system is gone. Therefore, when the vehicle starts from idle stop, the output voltage of the battery is raised before supplied to the electric devices such as the navigation system necessarily supplied with power of not less than a predetermined voltage at all times (for example, see Japanese Patent Application Laid-Open No. 2004-92564).

On the contrary, when the engine is being driven, since the output voltage of the alternator is higher than the driving voltages of the electric devices, power is supplied to the electric devices with the output voltage of the alternator being lowered, thereby reducing power consumption. For example, Japanese Patent Application Laid-Open No. H10-266920 describes a vehicle fuel pump motor control circuit that improves fuel economy by finely PWM-controlling the voltage applied to the motor of the fuel pump.

SUMMARY

However, although the transformation of the output voltage of the battery or the alternator as described in Japanese Patent Application Laid-Open No. 2004-92564 and Japanese Patent Application Laid-Open No. H10-266920 employs voltage transformation means both for use in raising voltage and for use in lowering voltage, the target electric devices are different, so that it is necessary to provide separate voltage transformation means for each.

The present invention is made in view of such circumstances, and an object thereof is to provide a power supply control apparatus capable of reducing the component cost by reducing the number of voltage transformation means provided to a vehicle.

A power supply control apparatus according to the present invention is characterized in that, in a power supply control apparatus provided with: voltage detection means for detecting an output voltage of a battery or an alternator provided to a vehicle; condition acquisition means for acquiring a condition of an engine provided to the vehicle; voltage transformation means for raising or lowering the output voltage; switching means for switching power supply to each of a plurality of in-vehicle devices provided to the vehicle to either of the output voltage and a voltage transformed by the voltage transformation means; and control means for outputting an instruction to switch the switching means based on the output voltage value detected by the voltage detection means and the condition of the engine acquired by the condition acquisition means, the switching means switches a destination of power supply between a first in-vehicle device group to which a voltage higher than V1 is to be supplied and a second in-vehicle device group other than the first in-vehicle device group, and the control means outputs an instruction to lower the voltage or an instruction to raise the voltage to the voltage transformation means, and outputs an instruction to switch between the first in-vehicle device group and the second in-vehicle device group to the switching means.

Thereby, since one voltage transformation means executes voltage lowering in addition to voltage raising, the component cost can be reduced by reducing the number of voltage transformation means provided to the vehicle.

The power supply control apparatus according to the present invention is characterized in that when the condition acquisition means acquires that the engine is revolving and the output voltage detected by the voltage detection means is higher than V2 (>V1), the control means outputs an instruction to lower the output voltage to V2 to the voltage transformation means, and outputs, to the switching means, an instruction to switch power supply to the second in-vehicle device group to the voltage transformed by the voltage transformation means.

Thereby, since reduction in power consumption by lowering to V2 the output voltage raised by the alternator generating power while the engine is revolving is realized by the voltage transformation means for raising the output voltage, the component cost can be reduced by reducing the number of voltage transformation means provided to the vehicle.

The power supply control apparatus according to the present invention is characterized in that when the condition acquisition means acquires that the engine is starting from idle stop and the output voltage detected by the voltage detection means is lower than V3 (V2>V3>V1), the control means outputs an instruction to raise the output voltage to V4 (V4≥V3) to the voltage transformation means, and outputs, to the switching means, an instruction to switch power supply to the first in-vehicle device group to the voltage transformed by the voltage transformation means.

Thereby, since the function of one voltage transformation means is switched to voltage lowering while the engine is revolving and to voltage raising during idle stop, the component cost can be reduced by reducing the number of voltage transformation means provided to the vehicle.

According to the present invention, a power supply control apparatus can be provided that is capable of reducing the component cost by reducing the number of voltage transformation means provided to the vehicle.

The above and further objects and features will more fully be apparent from the following detailed description with accompanying drawings.

DETAILED DESCRIPTION

Hereinafter, an embodiment of a power supply control apparatus according to the present invention will be described in detail based on the drawings.

Figure 1:
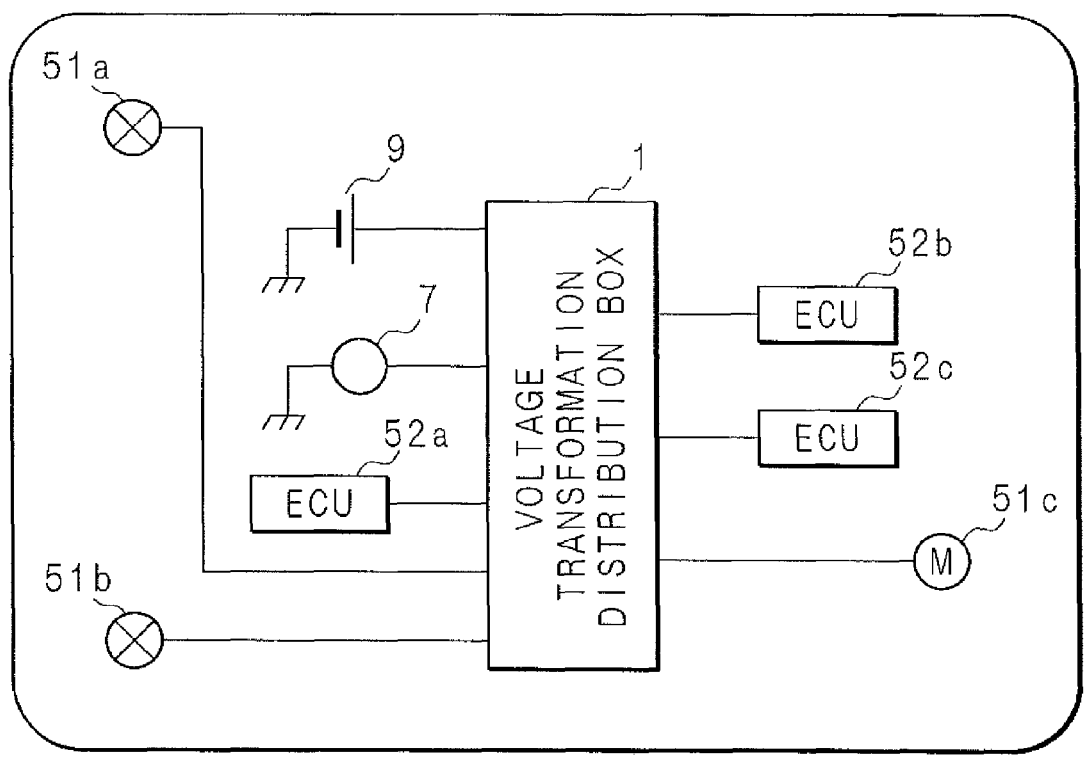
FIG. 1 is a schematic view schematically showing the general structure of a vehicle power supply system provided with an embodiment of the power supply control apparatus according to the present invention.

FIG. 1 is a schematic view schematically showing the general structure of a vehicle power supply system provided with the embodiment of the power supply control apparatus according to the present invention. The vehicle power supply system shown in FIG. 1 is provided with a voltage transformation distribution box 1, a battery 9, an alternator 7, a headlamp 51a, a headlamp 51b, a fuel pump motor 51c and a plurality of electronic control units (hereinafter, referred to as "ECUs") 52a, 52b, 52c, . . . (hereinafter, description will be given as to one ECU 52a).

To the voltage transformation distribution box 1, the output voltages from the battery 9 and the alternator 7 are applied. The applied voltages are applied to the ECU 52a, the headlamps 51a and 51b and the motor 51c after transformed or as it is by the voltage transformation distribution box 1. Details of the voltage transformation distribution box 1 will be described later.

The alternator 7 generates power by driving of a non-illustrated engine. The battery 9 stores the power generated by the alternator 7, and supplies the stored power to the voltage transformation distribution box 1.

The headlamps 51a and 51b illuminate the front of the vehicle. The motor 51c drives a fuel pump that supplies fuel to the non-illustrated engine. Although these electric devices each require a voltage of not less than a predetermined voltage value in order to execute a predetermined function, even if the voltage application is temporarily stopped, the function performed before the temporary stop is realized again by applying the voltage of not less than the predetermined value again. For example, when the voltage applied to the headlamp 51a becomes lower than a voltage value V2, the headlamp 51a is dimmed or turned off. However, by applying a voltage of not less than the voltage value V2 again, the headlamp 51a is lit with the original brightness. Moreover, the headlamp 51a is capable of sufficiently performing the function at the voltage value V2 that is lower than the output voltage of the alternator 7.

Accordingly, for in-vehicle devices such as the headlamp 51a, the voltage applied thereto can be lowered to V2 according to the vehicle state. Hereinafter, these in-vehicle devices will be referred to as "power saving loads" (second in-vehicle device group).

The ECU 52a is provided to each in-vehicle device to control the in-vehicle device. This in-vehicle device is, for example, a car navigation system, a meter (display) that indicates the speed, and a meter (display) that indicates the fuel level. The ECU 52a is provided to an electric device such as a car navigation system, and requires a voltage of not less than a predetermined voltage value V1 in order to hold the information stored in the memory. Hereinafter, devices that require the supply of power of not less than the predetermined voltage value V1 will be referred to as "stable voltage loads" (first in-vehicle device group).

Figure 2:
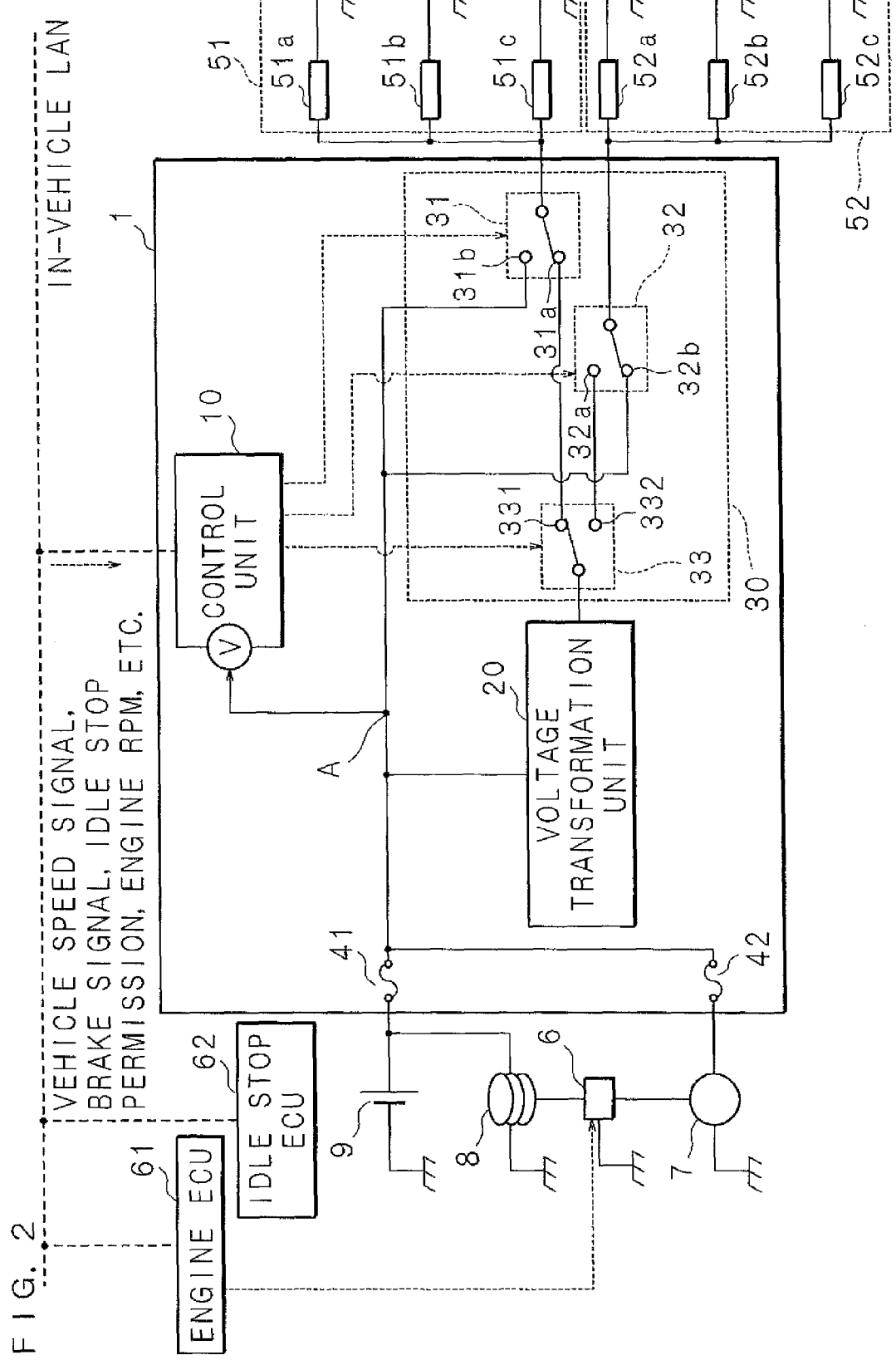
FIG. 2 is a block diagram showing an example of the structure of a voltage transformation distribution box shown in FIG. 1.

FIG. 2 is a block diagram showing an example of the structure of the voltage transformation distribution box 1 shown in FIG. 1. The voltage transformation distribution box 1 shown in FIG. 1 is connected to an engine ECU 61 and an idle stop ECU 62 as well as to the alternator 7, the battery 9, the headlamp 51a, the headlamp 51b and the fuel pump motor 51c (hereinafter, referred to as "power-saving load group" 51), and a plurality of ECUs 52a, 52b, 52c, . . . (hereinafter, referred to as "stable voltage load group" 52).

FIG. 2 further shows an engine 6 and a starter 8. The engine 6 is coupled so as to interlock with the alternator 7, and is coupled to the starter 8 by a non-illustrated clutch. The starter 8 receives the output voltage of the battery 9 to start the engine 6.

The voltage transformation distribution box 1 is provided with a control unit 10, a voltage transformation unit 20, a switching circuit 30, a fuse 41 and a fuse 42. The positive electrode of the battery 9 is connected to the input terminal of the voltage transformation unit 20 and the input terminal of the switching circuit 30 through the fuse 41. The output terminal of the alternator 7 is connected to the input terminal of the voltage transformation unit 20 and the input terminal of the switching circuit 30 through the fuse 42.

The output terminal of the voltage transformation unit 20 is connected to the power-saving load group 51 and the stable voltage load group 52 through the switching circuit 30.

The switching circuit 30 is provided with a switch 31, a switch 32 and a switch 33. The switch 31, the switch 32 and the switch 33 are all c-contact switches. The switch 31 has a COM terminal, a terminal 31a and a terminal 31b, the switch 32 has a COM terminal, a terminal 32a and a terminal 32b, and the switch 33 has a COM terminal, a terminal 331 and a terminal 332.

The output terminal of the voltage transformation unit 20 is connected to the COM terminal of the switch 33. The terminal 331 of the switch 33 is connected to the terminal 31a of the switch 31. The terminal 31b of the switch 31 is connected to the positive electrode of the battery 9 through the fuse 41, and is connected to the output terminal of the alternator 7 through the fuse 42. The COM terminal of the switch 31 is connected to the positive electrode of the power-saving load group 51.

The terminal 332 of the switch 33 is connected to the terminal 32a of the switch 32. The terminal 32b of the switch 32 is connected to the positive electrode of the battery 9 through the fuse 41, and is connected to the output terminal of the alternator 7 through the fuse 42. The COM terminal of the switch 32 is connected to the positive electrode of the stable voltage load group 52.

The control unit 10 is connected to an in-vehicle LAN. The control unit 10 acquires, through the in-vehicle LAN, a signal indicative of the engine condition including the engine RPM transmitted from the engine ECU 61. The control unit 10 acquires, through the in-vehicle LAN, information pertaining to idle stop outputted from the idle stop ECU 62. The control unit 10 acquires a voltage value VA at a common connection node A of the positive electrode terminal of the battery 9 through the fuse 41 and the output terminal of the alternator 7 through the fuse 42.

The engine ECU 61 controls the driving of the engine 6. The engine ECU 61 transmits a signal indicative of the condition of the engine 6 including the RPM of the engine 6 to the control unit 10 through the in-vehicle LAN. The idle stop ECU 62 controls the permission of idle stop and the start of the engine 6 from idle stop. The idle stop ECU 62 outputs a signal for starting the engine 6 from idle stop, to the control unit 10 and the engine ECU 61 through the in-vehicle LAN.

Figure 3:
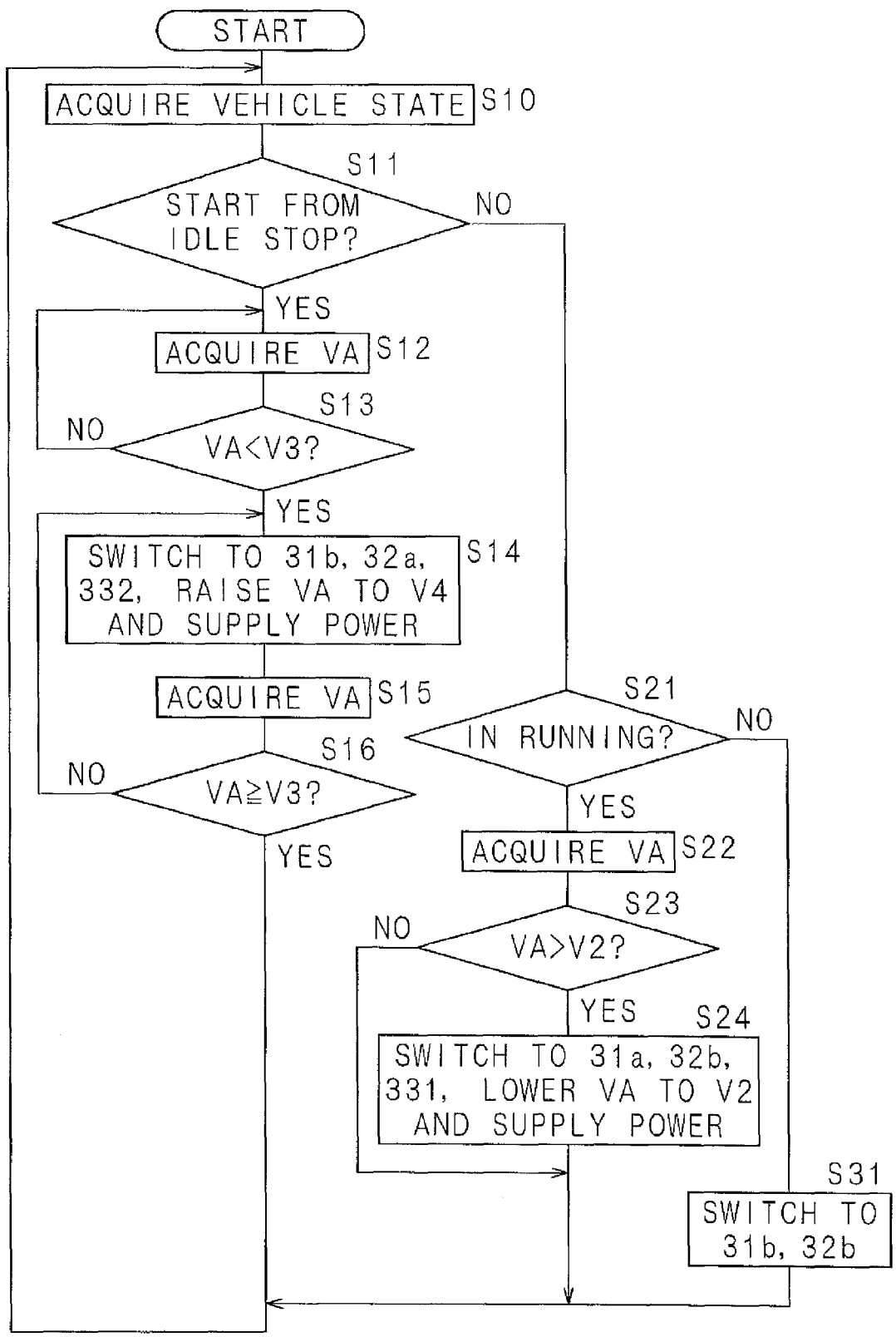
FIG. 3 is a flowchart showing an example of an operation of the power supply control apparatus according to the present invention.

Hereinafter, the operation of the power supply control apparatus having such a structure will be described with reference to the flowchart of FIG. 3. The switch 31, the switch 32 and the switch 33 are connected to the sides of the terminal 31b, the terminal 32b and the terminal 331, respectively.

First, the control unit 10 acquires the vehicle state (step S10). The control unit 10 determines and acquires the vehicle state based on a vehicle speed signal, a brake signal, an idle stop permission signal, an engine RPM signal and a signal to start the engine from idle stop which signals are received through the in-vehicle LAN.

When receiving the signal to start the engine from idle stop (step S11: YES), the control unit 10 acquires the voltage value VA at the node A (step S12). Then, the control unit 10 determines whether the acquired voltage value VA is less than V3 or not (step S13). Based on the minimum voltage V1 necessary for realizing the predetermined function of the stable voltage load group 52, V3 is set so as to be higher by an allowance than V1.

When the voltage value VA is not less than V3 (step S13: NO), the control unit 10 returns to step S12 and repeats the processing.

On the other hand, when the voltage value VA is less than V3 (step S13: YES), the control unit 10 switches the switches 31, 32 and 33 to the terminal 31b, the terminal 32a and the terminal 332, respectively, raises the output voltage (VA) of the battery 9 to V4, and supplies power (step S14). V4 is a predetermined value that is not less than V3. That is, the control unit 10 outputs, to the voltage transformation unit 20, an instruction to raise the output voltage (VA) of the battery 9 to V4, and switches the switches 31, 32 and 33 of the switching circuit 30. Thereby, a voltage raised to V4 by the voltage transformation unit 20 is applied to the stable voltage load group 52.

The control unit 10 then acquires the voltage value VA at the node A again (step S15), and determines whether the acquired voltage value VA is not less than V3 or not (step S16). When the voltage value VA is less than V3 (step S16: NO), the control unit 10 returns to step S14 and repeats the processing. On the other hand, when the voltage value VA is not less than V3, the control unit 10 returns to step S10 and repeats the processing.

When the vehicle state is not a state in which starting from idle stop is commenced at step S11 (step S11: NO), the control unit 10 determines whether the vehicle is running or not (step S21). The determination as to whether the vehicle is running or not is made based on the vehicle speed signal, the signal indicative of the engine RPM and the like which signals are received through the in-vehicle LAN. When the vehicle is running (step S21: YES), the control unit 10 acquires the voltage value VA at the node A (step S22).

The control unit 10 then determines whether the acquired voltage value VA is higher than V2 (>V1) or not (step S23). V2 is a driving voltage value determined to suppress the power consumption of the power-saving load group 51.

When the voltage value VA is higher than V2 (step S23: YES), the control unit 10 switches the switches 31, 32 and 33 to the terminal 31a, the terminal 32b and the terminal 331, respectively, lowers the output voltage value (VA) of the alternator 7 to V2, and applies it to the power-saving load group 51 (step S24). That is, the control unit 10 outputs, to the voltage transformation unit 20, an instruction to lower the output voltage value (VA) of the alternator 7 to V2, and switches the switches 31, 32 and 33 of the switching circuit 30. By the instruction from the control unit 10, the voltage transformation unit 20 transforms the output voltage value (VA) of the alternator 7 to V2.

When the voltage value VA is not higher than V2 at step S23 (step S23: NO) or after the processing at step S24, the control unit 10 returns to step S10 and repeats the processing.

When the vehicle is not running at step S21 (step S21: NO), the control unit 10 switches the switch 31 and the switch 32 to the terminal 31b and the terminal 32b, respectively (step S31), then, returns to step S10 and repeats the processing. That is, the control unit 10 switches the switch 31 and the switch 32 of the switching circuit 30. Thereby, the output voltage value (VA) from the battery 9 and/or the alternator 7 is applied to the power-saving load group 51 and the stable voltage load group 52.

Figure 4:
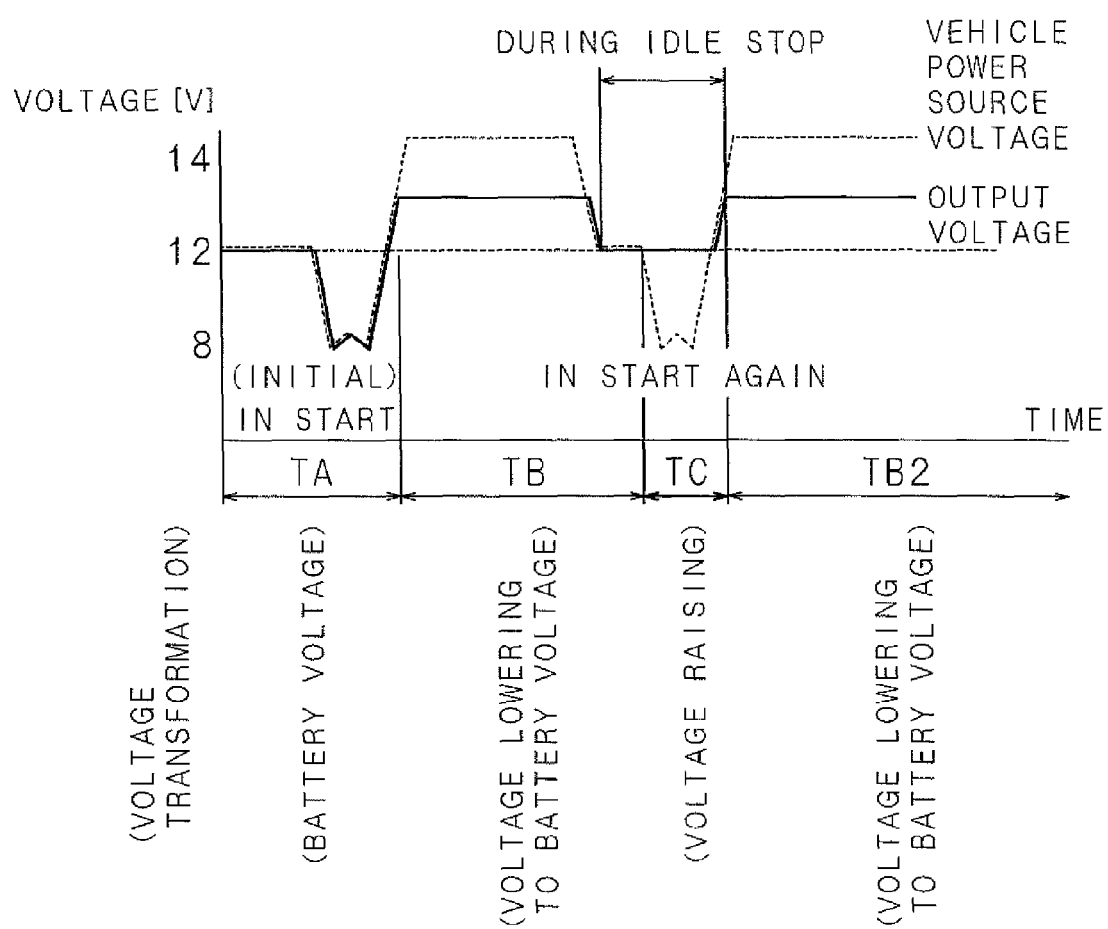
FIG. 4 is a timing chart showing an example of an operation of the power supply control apparatus according to the present invention.

FIG. 4 is a timing chart showing an example of the power supply controlled by this power supply control apparatus. During a period TA, the ignition key is turned on to start the engine. During the period TA, the voltage of the battery 9 is applied to the power-saving load group 51 and the stable voltage load group 52 by the control by the control unit 10. That is, the processing at step S31 of FIG. 3 is performed.

During a period TB, the engine is revolving and the vehicle is running. During the period TB, the alternator 7 is generating power. Therefore, when the voltage value VA at the node A exceeds V2, the output voltage (VA) of the alternator 7 is lowered to V2, and applied to the power-saving load group 51. That is, the processing at step S21 to step S24 of FIG. 3 is performed.

When the vehicle stops during the period TB, idle stop is started, and after idle stop is performed, the engine is started from idle stop during a period TC. During the idle stop period of the period TB, the output voltage from the battery 9 is applied to the node A. That is, the processing at step S31 of FIG. 3 is performed.

During the period TC, when starting of the engine 6 from idle stop is commenced, since the voltage value VA at the node A becomes lower than V3 because of cranking, the output voltage (VA) of the battery 9 that is raised to V4 is applied to the stable voltage load group 52. That is, the processing of step S11 to S16 of FIG. 3 is executed.

During a period TB2 subsequent to the period TC, starting of the engine from idle stop is ended, and the vehicle is running again. That is, the processing of step S21 to S24 of FIG. 3 is repeated.

By the above processing, the voltage transformation unit 20 lowers the voltage while the vehicle is running, and raises the voltage when the engine is started from idle stop. Since the voltage transformation unit 20 switches the function between voltage raising and voltage lowering at different times and switches the destination of power supply, the number of components can be reduced.

While the mode for carrying out the invention has been described above, the present invention is not limited to the embodiment described in the mode for carrying out this invention. It may be modified without departing from the gist of the invention.

INDUSTRIAL APPLICABILITY

The present invention is applicable to a power supply control apparatus that controls power supplied to various kinds of electric devices provided to a vehicle.

The embodiment disclosed herein is to be considered in all respects as illustrative and not restrictive. The scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power supply control apparatus, comprising:
a voltage detection unit that detects an output voltage of a battery or an alternator provided to a vehicle;
a condition acquisition unit that acquires a condition of an engine provided to the vehicle;
a voltage transformation unit that raises or lowers the output voltage;
a switching unit that switches power supply to each of a plurality of in-vehicle devices provided to the vehicle to either of the output voltage and a voltage transformed by the voltage transformation unit; and
a control unit that outputs an instruction to switch the switching unit based on the output voltage value detected by the voltage detection unit and the condition of the engine acquired by the condition acquisition unit,
wherein the switching unit switches a destination of power supply between a first in-vehicle device group to which a voltage higher than V1 is to be supplied and a second in-vehicle device group other than the first in-vehicle device group, and
the control unit outputs an instruction to lower the voltage or an instruction to raise the voltage to the voltage transformation unit, and outputs an instruction to switch between the first in-vehicle device group and the second in-vehicle device group to the switching unit.

2. The power supply control apparatus according to claim 1,
wherein when the condition acquisition unit acquires that the engine is revolving and the output voltage detected by the voltage detection unit is higher than V2 (>V1), the control unit outputs an instruction to lower the output voltage to V2 to the voltage transformation unit, and outputs, to the switching unit, an instruction to switch power supply to the second in-vehicle device group to the voltage transformed by the voltage transformation unit.

3. The power supply control apparatus according to claim 2,
wherein when the condition acquisition unit acquires that the engine is starting from idle stop and the output voltage detected by the voltage detection unit is lower than V3 (V2>V3>V1), the control unit outputs an instruction to raise the output voltage to V4 (V4≥V3) to the voltage transformation unit, and outputs, to the switching unit, an instruction to switch power supply to the first in-vehicle device group to the voltage transformed by the voltage transformation unit.

* * * * *